Patented Jan. 10, 1933

1,893,677

UNITED STATES PATENT OFFICE

FREDRICH OLSEN, OF DOVER, NEW JERSEY

PURIFICATION OF NITROCELLULOSE

No Drawing.   Application filed March 1, 1929.  Serial No. 343,833.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to a process of purifying cellulose, especially nitrocellulose.

In the preparation of nitrocellulose, the cellulose is nitrated in a bath of nitric and sulphuric acid. When removed from the bath, the fibers carrying both adherent or mechanically held acid and adsorbed acid as well as other impurities must be subjected to a purification treatment to remove these unstable lower nitro bodies. In the standard hydraulic treatment consisting in a prolonged boiling, forty hours, with not less than four changes of water, it is assumed that the removal of acids such as free sulphuric acid is best accomplished by providing water into which the acid may pass into solution from association with the nitrocellulose fibre. In view, however, of the known ease with which sulphuric acid is dissolved in water, it is apparent from the protracted boiling and washing treatment which is accorded the nitrocellulose, that there exist forces which hold the sulphuric acid with unusual tenacity to the nitrocellulose. It is moreover common experience that washing nitrocellulose with alkaline solutions does not effect a complete neutralization of the free acid solution held by the fibres. It would seem that the forces which hold the acid to the fibre are greater than the forces tending to cause the acid to go into solution in the water or than those tending to bring about the chemical union of the acid with an alkali.

These superior forces are those of adsorption, which cause the sulphuric acid or other impurities to be very closely bound to the surface of the nitrocellulose. It is not necessary to suppose that the surface on which the impurities are adsorbed comprises only the outer surface of the cotton hair or other form of cellulose, but also the internal surface of the fibre tube, and perhaps even the surface of the colloidal particles of which the cotton or other fibre is an aggregate. The force with which the adsorbed acid is held to the nitrated cellulose, may be called the adhesion tension, which is, therefore, a measure of the tendency of the acid to adhere to the nitrocellulose. The material which has a higher adhesion tension for nitrocellulose will therefore be held more securely by nitrocellulose than a material whose adhesion tension is lower; and as a consequence it will be exceedingly difficult, if not impossible, to remove a material of higher adhesion tension from nitrocellulose by means of a material of lower adhesion tension.

When the adhesion tension is determined of a number of substances for a material of the general physical and chemical character of nitrocellulose, it is found that acids in general have higher adhesion tension than water, which in its turn has a higher adhesion tension than alkalis such as sodium carbonate, calcium carbonate, etc., in the form of dilute aqueous solutions. It has been found that those materials of higher adhesion tension for nitrocellulose can displace the materials having a lower adhesion tension. If a solution of the material whose adhesion tension for nitrocellulose is higher than that of sulphuric acid is brought into contact with the nitrocellulose it may be used as a purification means to effect the removal of the sulphuric acid.

A large number of substances have been considered from the standpoint of their adhesion tension for nitrocellulose and other cellulose materials. Several substances have been found with higher adhesion tension values than sulphuric acid, and solutions of these materials have been found to effect a marked increase in stability frequently at very rapid rates, and with the consumption of very small amounts of the strongly adsorbed reagents with or without water or other vehicle for bringing the reagents into intimate contact with the surface of the fibres. From among those substances which are found to be strongly adsorbed by nitrocellulose, it is, of course, desirable to select those materials which have no inherent tendency to bring about the decomposition of nitrocellulose; and it is of economic advantage to use those materials which are relatively cheap or which permit of easy recovery. Among those substances which have proven to be of especial value are substances of the organic amine class, and the following list gives examples of the most successful amines:—

Aniline red.
Metaphenylenediamine.
Urea and various substituted ureas such as diethyldiphenylurea.
Bismarck brown.
Methyl orange.
Diphenylamine, etc.

It is recognized that certain of these materials, especially diphenylamine, have long been known and used as stabilizers. However, it is in an entirely different manner and for an entirely different specific purpose that these and other materials are now employed. For example, when diphenylamine is used as a stabilizer, as in the manufacture of military propellent powders, it is incorporated with the nitrocellulose in the form of an ether solution of diphenylamine in the mixing operation. It is one of the important features of this present invention that the purification agents comprising the material whose adhesion tension is greater than that of sulphuric acid is added to the nitrocellulose at a stage in the process and under conditions which permit either the removal of the displaced sulphuric acid or its neutralization to form a stable compound.

A convenient way of carrying out the process of purifying nitrocellulose is as follows:

The nitrocellulose immediately after being nitrated is separated from the spent acids in the ordinary manner by centrifuging. It is then drowned in water in the customary manner. Instead of proceeding with a boiling treatment in sour water, as is current practice, for the purpose of hydrolyzing cellulose sulphates and other cellulose esters of poor stability, it is preferred to subject the nitrocellulose to a beating action in which not only are the neps or clumps of nitrocellulose completely separated but the individual fibers themselves opened up or fibrillated. The beaten material is then preferably subjected to a short boiling in sour water in order to effect the hydrolysis to which reference has been made above. This hydrolysis takes place more readily in the case of the beaten material because more surface is exposed to the action of the hydrolyzing liquors, and also because a very efficient agitation can be conveniently provided when the material is in a finely divided condition. The greater proportion of the free acid associated with the nitrocellulose can now be readily removed or neutralized by a short boiling treatment, or even by a washing treatment in water considerably below the boiling point, provided this water is of an appreciable degree of hardness, the hardness being due to dissolved calcium or magnesium carbonates or bi-carbonates. Further boiling will be found to be of little avail, and indeed to be quite inefficient, in the removal of the small amount of residual acid. So difficult is it to remove this adsorbed acid that in the boiling treatment ordinarily given the desired cellulose nitrate is itself decomposed continuously by the prescribed boiling and washing treatment. In addition, prolonged boiling will generate more acid by decomposition of nitrocellulose than is removed by the waters used in such boiling or washing treatments.

These final residues of acid are, therefore, removed in accordance with my invention by washing the nitrocellulose with a solution of some material which is more strongly adsorbed by the nitrocellulose than are the acid impurities. For example, a one-half per cent solution of urea in water may be used, or a one-half per cent solution of diphenylamine in alcohol may be used. One such washing in, for example, the alcohol-diphenylamine solution for one-half hour has effected a degree of stabilization superior to that accomplished by twenty hours boiling with water.

As a further example, a solution comprising 0.1 of a gram of Bismarck brown in 300 cc. of water will effect a greater stabilization of 30 grams of nitrocellulose in one hour than is secured by the use of ten (10) separate boilings of one hour each with fresh water involving the use, therefore, of three (3) liters of water instead of 0.3 of a liter.

The treatment with the alcohol solution of diphenylamine may be carried out in an ordinary tub, the solutions being removed from the purified nitrocellulose by settling, by filtration, by centrifuging, etc., or the solution may be sprayed upon the nitrocellulose as it is being filtered or the diphenylamine may be added to the alcohol which is ordinarily employed in the dehydration of the nitrocellulose, enough diphenylamine being allowed to remain in the nitrocellulose so that the ether subsequently used in the gelatinization need contain no diphenylamine.

When the urea is dissolved in a 50/50 mixture of neutral water and neutral alcohol stabilization is secured still more readily.

Similarly, a marked improvement in stability is secured by allowing unstable nitrocellulose to soak in an aqueous solution of diphenylamine even though the concentration of such a solution is very small. When diphenylamine is dissolved in a mixture of alcohol and water, a marked improvement in stability is achieved.

The use of the purification agents described above is applicable to the stabilization of nitrocellulose at any point in the process between the stages of nitration and the stage where gelatinization of the nitrocellulose is effected.

I claim:

1. The process of preparing nitrocellulose comprising nitrating cellulose, removing the spent acid, drowning the nitrated cellulose in water, subjecting the cellulose nitrate to a short boil, washing the cellulose nitrate with a solution containing an organic amine in an amount slightly in excess of the unstable elements to be displaced, then gelatinizing the nitrated cellulose.

2. The process of preparing nitrocellulose comprising nitrating cellulose, removing the spent acid, drowning the nitrated cellulose in water, then beating the cellulose nitrate, subjecting the cellulose nitrate to a short boil, washing the cellulose with a solution containing an organic amine in an amount slightly in excess of the unstable elements to be displaced, then gelatinizing the nitrated cellulose.

3. The process of preparing nitrocellulose comprising nitrating cellulose, removing the spent acid, drowning the nitrated cellulose in water, subjecting the cellulose to a short boil, washing the cellulose nitrate with a solution containing an organic amine in an amount slightly in excess of the unstable elements to be displaced.

4. The process of preparing nitrocellulose comprising nitrating cellulose, removing the spent acid, drowning the nitrated cellulose in water, beating the cellulose nitrate, subjecting the cellulose nitrate to a short boil, then washing the cellulose with a solution containing an organic amine in an amount slightly in excess of the unstable elements to be displaced.

5. The process of preparing nitrocellulose comprising nitrating cellulose, removing the spent acid, drowning the nitrated cellulose in water, subjecting the cellulose nitrate to a short boil, then washing the cellulose nitrate with a solution containing an organic amine.

6. The process of preparing nitrocellulose comprising nitrating cellulose, removing the spent acid, drowning the nitrated cellulose in water, beating the cellulose nitrate, subjecting the cellulose nitrate to a short boil, then washing the cellulose with a solution containing an organic amine.

FREDRICH OLSON.